United States Patent [19]
Elliott et al.

[11] Patent Number: 4,734,841
[45] Date of Patent: Mar. 29, 1988

[54] LASER POWER SUPPLY CIRCUIT

[75] Inventors: Randy D. Elliott; Matt D. Schler, both of Eugene, Oreg.

[73] Assignee: Spectra-Physics, Inc., San Jose, Calif.

[21] Appl. No.: 907,291

[22] Filed: Sep. 12, 1986

[51] Int. Cl.⁴ .................. H02M 3/335; H01S 3/00
[52] U.S. Cl. ........................... 363/21; 363/97; 315/171; 315/307; 315/DIG. 7; 372/83; 372/86
[58] Field of Search .................. 363/18–21, 363/49, 97, 60, 61; 315/170–174, 289, 307, DIG. 7; 350/3.71, 6.2, 6.3; 372/83, 86, 87

[56] References Cited

U.S. PATENT DOCUMENTS

| | | | |
|---|---|---|---|
| 3,967,159 | 6/1976 | Dendy et al. | 363/21 X |
| 4,092,710 | 5/1978 | Wadsworth | 363/19 |
| 4,201,949 | 5/1980 | Robbins | 372/86 X |
| 4,286,193 | 8/1981 | King, Jr. et al. | 315/289 X |
| 4,623,824 | 11/1986 | Scolari et al. | 315/307 X |
| 4,677,631 | 6/1987 | Pithie | 372/38 |

Primary Examiner—Patrick R. Salce
Assistant Examiner—Emanuel Todd Voelfz
Attorney, Agent, or Firm—Donald C. Feix; T. M. Freiburger; Paul Davis

[57] ABSTRACT

A power supply circuit for a gas laser has primary circuitry and secondary circuitry supplied by the primary circuitry. A transformer is positioned between the primary circuitry and a secondary circuitry. Within the secondary circuitry is a spark gap and associated circuitry for creating a voltage buildup to achieve a high ionization voltage required for the laser and for releasing the high ionization voltage in pulses for starting the laser. The circuit further includes laser operating supply circuitry associated with the secondary circuitry and the primary circuitry for supplying the laser at a normal operating voltage much lower than the ionization voltage after the laser has started.

14 Claims, 4 Drawing Figures

LASER POWER SUPPLY CIRCUIT

BACKGROUND OF THE INVENTION

The invention relates to gas lasers, and more particularly to a power supply for a gas laser wherein a high ionization voltage is efficiently produced, for initially starting the laser, while a much lower operating voltage is supplied after the laser has started.

It is important in most laser installations that the current to the laser be held constant, so that the power output of the laser is relatively constant. Gas lasers require a more or less constant operating current even to function at all, and are especially sensitive to minor operating current variations.

In lasers used in bar code scanners, the edges between the light bars and dark bars on the bar code must be detected, and this amounts to detecting a difference in power level with associated detector circuitry of the scanner. In such devices if the laser tube power level itself is fluctuating, this could make it appear to the rest of the electronic systems that a label is being read, i.e. that edges between light and dark are being detected.

Therefore, particularly in laser scanner applications, it is very important that the power supply or the laser supply current be at a constant level to the laser, to produce a beam of constant output power.

Gas lasers generally require a very high ionization voltage for starting the laser, as compared to the much lower voltage required for normal operation of the laser after it has started. Prior to the present invention, the high ionization voltage was supplied by providing a larger power supply or by using a series of stages for multiplying the voltage for starting, with the multiplier stages inoperative when the laser is in a normal operating mode. These multiplier stages, which can be up to four or five stages in some applications, require a high parts count in the circuitry and correspondingly increased cost and space requirements.

SUMMARY OF THE INVENTION

In accordance with the present invention, a power supply for a gas laser ensures a substantially constant current to the laser and correspondingly constant beam output power, and also provides in a secondary circuit a means for sending quick pulses of very high ionization voltage through the laser for starting the tube, without the need for a relatively long series of multiplier stages for providing the high starter voltage. Multiplier stages alone could not produce the quickly pulsed ionization voltage supplied in accordance with this invention.

In one embodiment of the present invention, a power supply for a gas laser includes a primary controlled and switched flyback topology, and secondary circuitry supplied by the primary circuitry, with a transformer between the primary circuitry and the secondary circuitry. The secondary circuitry includes a spark gap means for creating a voltage buildup to achieve a high ionization voltage required for the laser and for releasing the high ionization voltage in quick pulses for starting the laser. There are further included operating supply means associated with the secondary circuitry and primary circuitry for supplying the laser at a normal operating voltage much lower than the ionization voltage after the laser has started.

In a preferred embodiment, the operating supply means includes a feedback loop means from the cathode side of the laser into the primary circuitry, for monitoring cathode side voltage and controlling the secondary side voltage at the transformer, in a servo loop.

Also in a preferred embodiment of the invention, the secondary circuit includes a maximum of two switchable multipliers supplying the spark gap means, the multipliers being switchable in response to the existence of a current flow through the laser.

Another feature of the invention is that the primary circuitry includes a control integrated circuit for controlling switching functions and for controlling startup and turn-on functions dependent upon input line voltages, with the primary circuitry including integral low voltage power supply means for supplying the control integrated circuit with a much lower voltage than the voltage fed through the primary circuitry to the primary side of the transformer. Thus a low voltage power supply is contained within the power supply.

A further feature is that a scanner motor is associated with the laser, with a signal means associated with the motor for generating a speed-representative signal. The primary circuitry includes laser shutoff means for shutting off power to the laser if the motor is below normal operating speed, including solid state switch means receiving the speed representative signal from the scanner motor and for causing laser supply power to be shut off when the signal indicates underspeed. These solid state switch means preferably comprise opto-coupled isolator switches. Preferably, one of these solid state switch means also shuts off laser supply power and, via other logic, the motor itself, in a motor overspeed condition.

The opto-coupled isolators provide a barrier between two circuits, eliminating noise problems which might otherwise occur, and ensuring that regulatory and safety requirements are met.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF PREFERRED EMBODIMENTS

Figure 1:
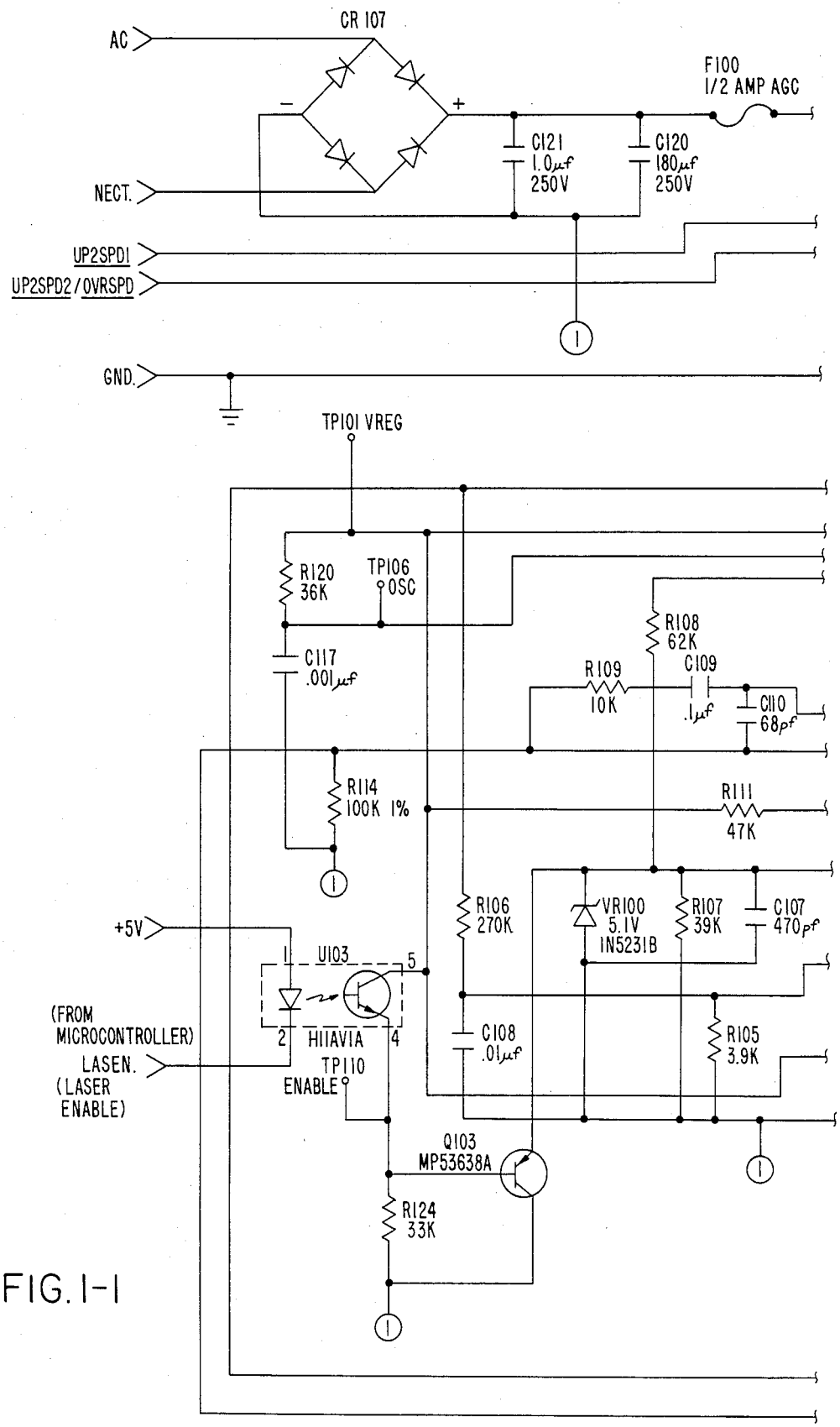
FIG. 1 is a schematic circuit diagram showing both primary side circuitry and secondary circuitry of a laser power supply in accordance with the present invention.

FIG. 1 shows laser power supply circuitry in accordance with the invention. This circuitry comprises a discontinuous flyback type topology.

In principal effect, the illustrated circuitry takes a DC voltage, switches the voltage through a switch and generates through a transformer a secondary voltage that has been stepped up, approximately 7 times in this preferred embodiment. That secondary voltage has been multiplied and rectified and provides a high voltage for the laser tube.

Primary circuitry is on the left of FIG. 1, from the center of T100 over to the left. Secondary circuitry is shown to the right.

The circuitry illustrated provides a switch that is controlled in a fashion that avoids overcurrent problems and enables control of the amount of "on" time of the switch depending upon the level of output voltage. I.e. if the output voltage drops and gets below a certain point, it is increased and regulated by the circuitry in a feedback mode. In effect, a voltage is sampled across a sample resistor; and that feedback voltage is used to control the "on" time of the switch so that the longer the switch is on the more energy is being stored in the primary side of T100 and thus the higher amount of energy is transformed or transferred to the secondary when the switch is switched off. Through the rectifier and multiplier stages of the secondary, that provides more voltage or current to the laser tube (LT1 in FIG. 1). Thus, secondary voltage is controlled by the "on" time of the switch, with feedback control via line A in the drawing. If the switch is on longer, more storage is generated in the primary coil and more energy in the secondary. If there is too much voltage in the secondary, that is sensed through feedback and the switch is turned on for a shorter amount of time. The switch is shown as Q100 in the drawing. This is the manner in which laser supply power is controlled in accordance with the invention.

There are other functions of the primary side circuitry. For example, an error amplifier E/A is built into the primary side. It helps convert the feedback voltage into something that can be used in the integrated circuit U100.

An over voltage protection of the system is included. If the input line voltage goes above a programmed value, the laser is shut off as a protection. An under voltage protection assures that if the input line voltage is too low, the laser will be kept off. A current limit prevents an excess amount of current from being put through the switch Q100, which is a MOS-FET power transistor.

The IC U100 has current limit capability, so it can sense the amount of current that is being driven through the MOS-FET Q100. If it exceeds a threshold point, U100 can shut the drive to the transistor off. It has an onboard oscillator and ramp generator for the pulse-width modulator. The U100 IC thus acts as a controller on the primary side. It tells the switch (Q100) when to go on and for how long, and it does that based on two bits of information it receives: (1) the feedback voltage, which tells it what the condition of the secondary voltage and current is, i.e. within limits or not; and (2) the current sense of the MOS-FET. Based on those two inputs, U100 either drives the MOS-FET harder or not as hard.

One important feature of the illustrated system is the inclusion of three optical coupled control switches or opto-coupled isolators U101, U102 and U103, each of which internally comprises an LED and a phototransistor. As is well known, opto-isolators provide a barrier or isolation between one circuit (a primary circuit) and another circuit (a secondary circuit). The opto-coupled isolators eliminate noise problems inherent when a primary side circuit is switched with a secondary side controller, and also provide isolation for safety and regulatory requirements—isolation between the laser power supply on the one side, and the motor sensing/control circuitry on the other side. Using light, the opto-isolators assure that there is no direct connection between the two sides.

The three opto-isolators used in the system of the invention are for control of the laser supply. I.e., the laser supply is turned on and off by other motor sense/control circuitry, outlined below, through the opto-isolators. Such motor sense/control circuitry is the subject of copending application Ser. No. 907,293, filed Sept. 12, 1986 for a Laser Scanner with DC Brushless Motor, assigned to the assignee of the present invention. As disclosed in the copending application, the control circuitry to which the opto-isolators are connected provides solid state safety switching of both the laser power and the power to the scanner motor, eliminating mechanical windswitches as used in the prior art. The opto-isolators U101 and U102 in essence take the place of a windswitch, with inputs from the motor sense/control circuitry (UP2SPD1 to U101 and UP2SPD-2/OVRSPD to U102).

The underspeed and overspeed control functions are explained further below with respect to FIG. 3 and also in the referenced copending application Ser. No. 907,293.

At Test Point 111 (TP111) on the drawing is a DC voltage that is rectified directly and is approximately in the 200 volt DC range, which is a rather high DC voltage. That voltage is used to drive the MOS-FET switch; however, it is too high to control or to supply power for the rest of the support circuitry within the laser supply. Therefore, in order to have a separate supply within the circuit itself, a tertiary winding is taken off the transformer (orange/grey leads on the transformer T100) and used to provide a small power supply within the power supply. The small power supply generates approximately 14 to 20 volts DC, used to supply voltage to the U100 IC chip, through the line identified as B in the drawing.

This avoids the use of a large wattage resistor in the circuitry, consuming excess energy in order to drop the voltage from 200 volts down to about 20 volts.

The secondary circuitry is in FIG. 1 from the center of T100 to the right side of the drawing. When a laser tube is off, it presents an almost open load and it stays an open load basically until the laser tube ionizes and lases, and that may require in excess of 8000 volts. Once the laser tube is ionized and is in the lasing mode, it typically operates at around 1000 volts. Thus the supply has to be capable of voltages greater than 8000 volts; but once the tube lases, it has to be capable of regulating at a much lower level voltage.

Typically this requirement has been addressed by use of what are called multiplier stages within the secondary circuitry, which successively increase voltage only for startup, to supply extra voltage to the output of the laser supply. They are basically nonfunctional once the laser has begun lasing. Thus, if 8000 volts were required, in some previous circuitry four multipliers were required, sometimes five, to get up beyond 8000 volts. Each multiplier comprises two diodes and one capacitor, amounting to a large number of components which are not used much of the time.

In accordance with the invention, spark gap circuitry is incorporated in the laser supply, comprising a spark gap SG100, C103, CR100 and R102. Basically the spark gap circuitry replaces two doubler stages by providing for a large buildup of voltage which is released in quick pulses to start the laser.

The present circuitry includes two multiplier stages—C104, CR103 and CR102; and CR102, CR101 and C100. From there the startup voltage is generated by the spark gap circuitry.

In operation of the power supply, if the laser tube has not lased and the doubler stages have built up the voltage at the right side of R100 (point X on the drawing), what initially happens is that all the voltage at point X appears across the resistor R102 so that the voltage at point X and the voltage at a point Y are basically the same. The difference of potential across the spark gap is virtually zero. But as C103 charges, with an RC time constant determined by R102, the voltage at point Y decreases because the voltage across the capacitor increases as voltage across the resistor decreases.

Figures 1, 2:
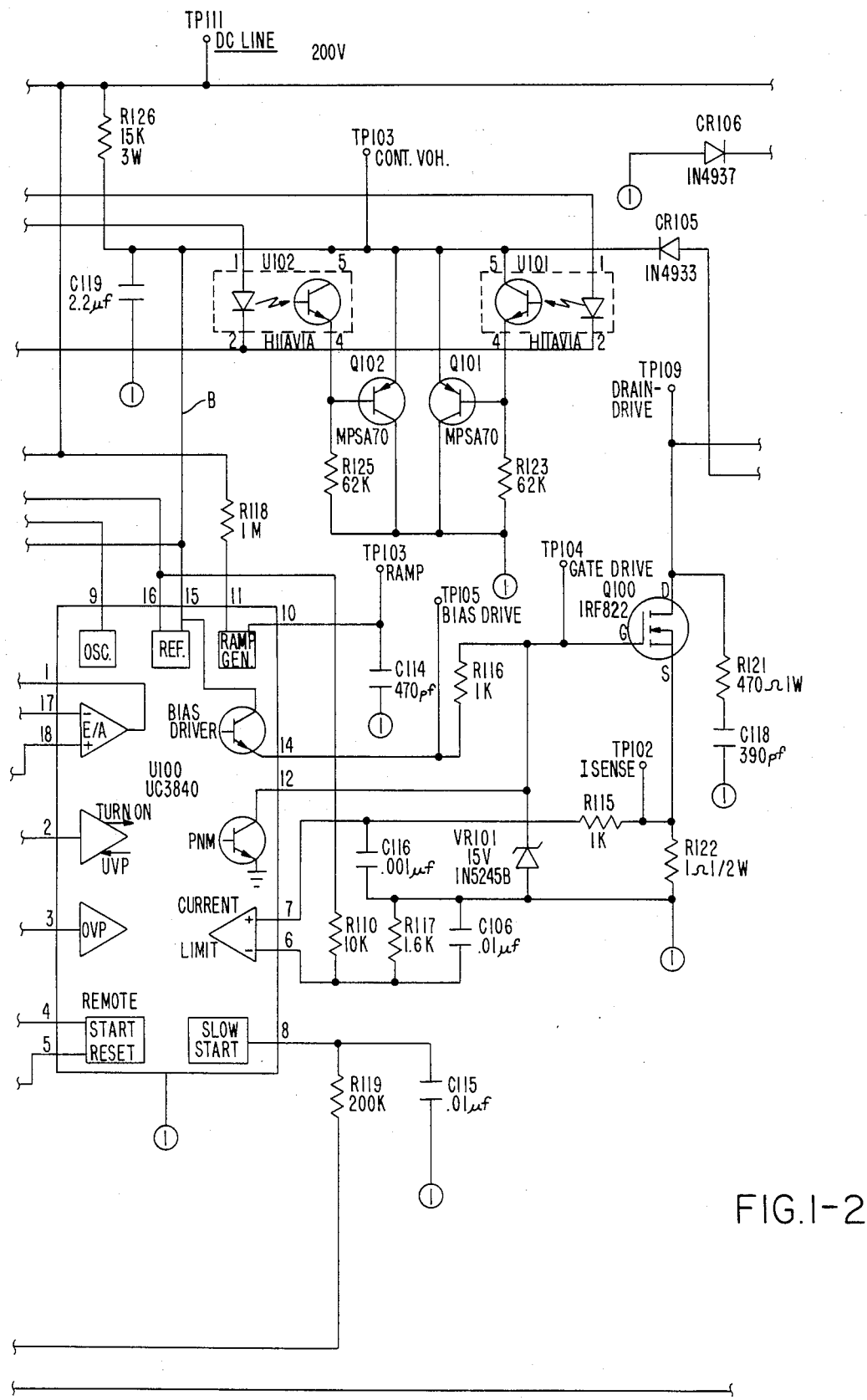
FIG. 2 is a graph of voltage versus time, showing schematically a spark gap-created pulsing of high ionization voltage for starting a laser, in accordance with the invention.

As soon as the potential between points X and Y becomes equal to or above the spark gap voltage, which in this case may be about 2500 volts, the spark gap arcs over. When it arcs over, it takes the voltage that is charged up across C103 (approximately 2500 volts) and it puts it in series with the voltage at point X which is typically about 5200-5800 volts because of the previous multiplier stages. This in effect immediately stacks onto the point X voltage a very quick spike of about 2500 volts. As shown in FIG. 2, an approximate plot of voltage out with respect to time, a voltage of about 2500 volts stacked on top of the 5800 volts gives a capability of over 8000 volts. This enables elimination of at least two more multiplier stages that were required in the prior art, and it also adds a very important benefit that addresses a characteristic of starting laser tubes—instead of a slow rising voltage slope, the system provides a very quickly rising slope, i.e. a very quick dv/dt. That helps ionize a laser tube far more quickly than a slow rising slope.

The spikes shown in FIG. 2 will continue to repeat until the laser tube lases, at a repetition rate determined primarily by the RC time constant. If the pulse rate is too slow to start the tube soon enough, the RC time constant can be changed to increase the repetition rate, or it can be changed to decrease it.

It should be understood that the 5800 volt level and the 8000 volt level in FIG. 2 are relative values and will vary from one circuit board to another, and with input line voltage.

Once the laser tube has ionized and started lasing, then basically the multipliers and the spark gap circuitry are no longer required, and the current path is essentially a direct path through CR103, CR102, CR101, CR100, through the ballast resister R101 and through the laser tube LT1. With the laser lasing, the voltage at point X is at a much lower value than before starting, for example 1500 volts, so that the difference across the spark gap, i.e. between points X and Y is not significant enough to create a spark condition. Additionally, when the laser tube is lasing, the feedback loop, that is line A, delivers the feedback voltage to the primary circuitry, resulting ultimately in the switching on of the primary winding of the transformer T100 for lesser durations. Ultimately that ensures that less energy is available in the secondary of the circuitry.

Conversely, if the laser tube is not lasing, the feedback loop is essentially open and the U100 and the error amp circuitry associated with it drive the MOS-FET much harder to allow the transfer of a greater amount of energy into the secondary that enables a sufficient amount of energy for all the multiplier stages and the spark gap circuitry to operate.

Accordingly, the spark gap circuitry eliminates the need for a number of components. It also adds the very quick, sharp dv/dt pulse which is better for starting the laser than a slower rising voltage. Cost and space requirements are lower.

Figures 1, 2, 3:
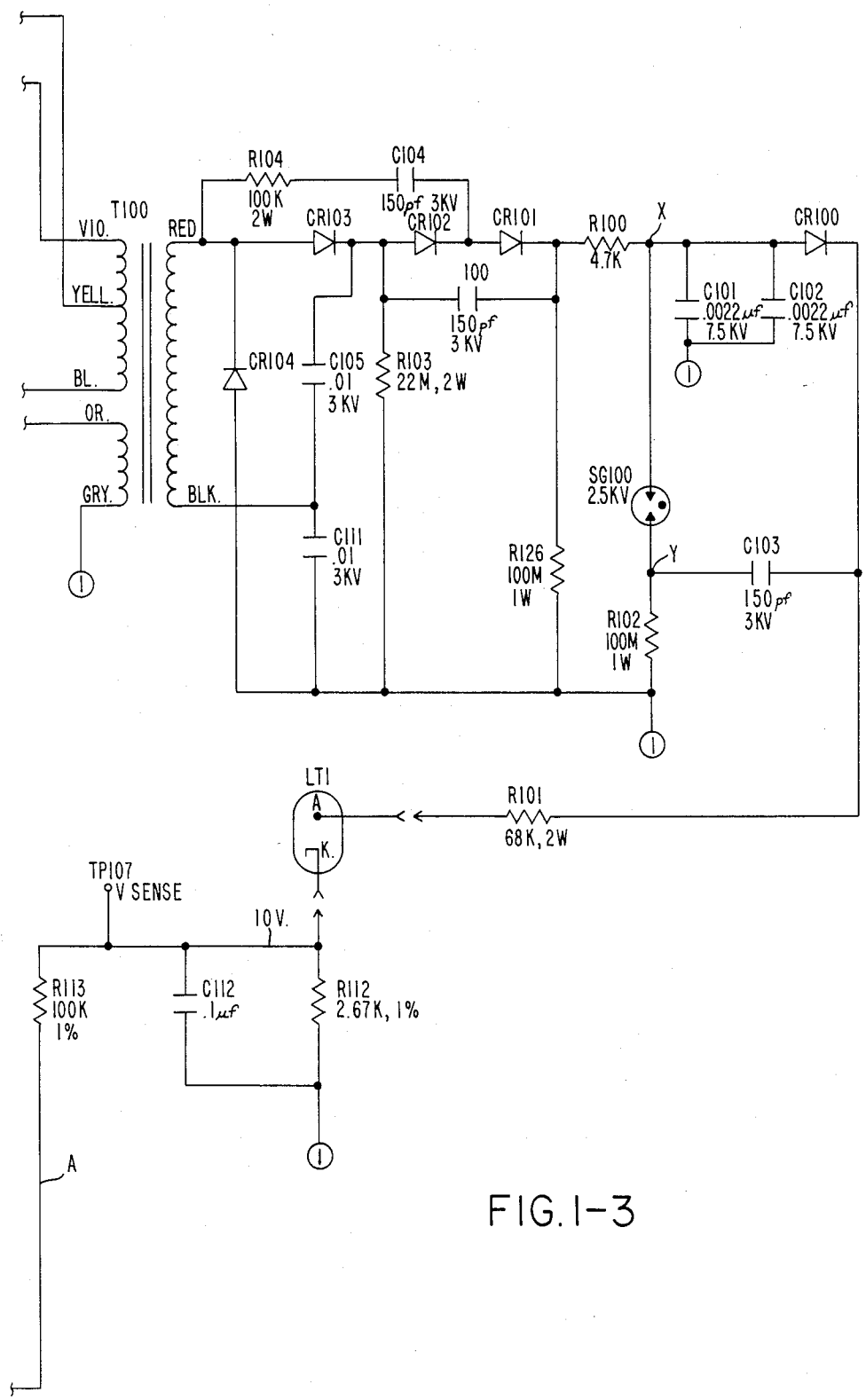
FIG. 3 is a block diagram indicating a laser safety interlock system which cooperates with a DC brushless motor of a laser scanner, and part of which is embodied in the laser power supply circuitry shown in FIG. 1.
Figure 2:
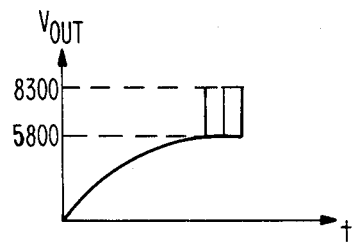
Figure 3:
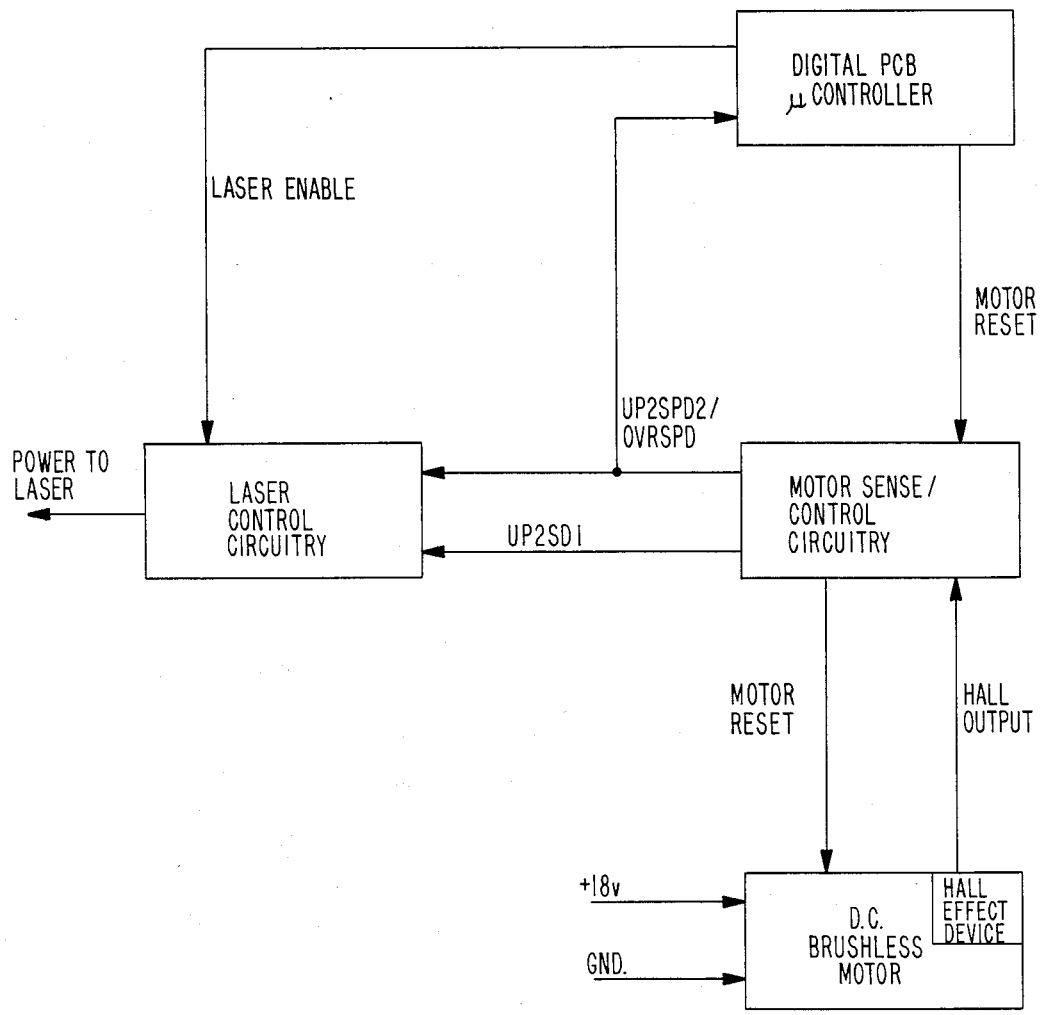

FIG. 3 indicates in block diagram form the safety interlock shutoff features referred to above, illustrating the functional interconnection between a DC brushless motor, the motor sense/control circuitry, a microcontroller (all of which are described in above-referenced copending application Ser. No. 907,293, and the laser power control subsystem as described herein, relative to U101, U102 and U103. A hall effect device is associated with the DC brushless motor and provides a hall output for the motor sense/control circuitry.

As illustrated in FIG. 3, the motor sense/control circuitry utilizes the hall output to generate the up-to-speed and overspeed signals and also allows the microprocessor to shut down the power to the motor, thus stopping or resetting the motor.

Both the UP2SPD1 and UP2SPD2/OVRSPD circuits are completely separate and ultimately redundant, as described in the referenced copending application.

As described above, the laser control circuitry portion of the power supply may consist of three optically isolated control switches U101, U102 and U103. Two of the switches shunt the laser control IC power supply to ground, thus disabling the entire laser supply, when activated. Both of these switches are enabled and disabled by the UP2SPD1 and UP2SPD2/OVRSPD signals, which are separate and redundant. The third optoisolator is enabled/disabled by the microcontroller, as outline above. This third switch shuts the laser control IC down by shunting the start control pin to ground, effectively shutting down all power to the controlled power MOS-FET switch Q100 of the control circuitry.

The microcontroller, indicated in FIG. 3 as being on a digital printed circuit board, continually monitors the UP2SPD2/OVRSPD signal and either enables or disables the laser and/or motor, depending upon the level and sequence of the UP2SPD2/OVRSPD signal.

The laser safety interlock feature indicated in FIG. 3 thus has two major functions: (1) to ensure that a stationary laser beam (or a too-slowly moving laser beam) cannot exit the scanner; and (2) to ensure that an over-speed condition of the motor does not occur.

On normal power-up, the sequence is as follows. Initially upon power-up, the UP2SPD1, UP2SPD2/OVRSPD and Laser Enable signals are all disabled, ensuring that the laser is off. As the motor reaches the up-to speed lower trip point, which may be in the range of about 3500 to 4000 RPM, UP2SPD1 and UP2SPD2/OVRSPD are enabled. Simultaneously the microcontroller verifies that the UP2SPD2/OVRSPD signal has gone through a low to high transition, i.e. the motor has indeed come up to speed and the signal was not just "latched" high. After the microcontroller has verified this transition sequence, it will enable the Laser Enable signal, thus turning on the laser. The scanner is functional at this point.

In the event of a quick power outage or if the scanner is unplugged and re-powered quickly, the microcontroller may not detect a low to high transition of the UP2SPD2/OVRSPD signal because the motor might still be up to speed. If this is the case, the microcontroller will shut the motor off, via the motor reset line indicated, for 5 seconds to allow the motor to glide down to below the up-to-speed comparator threshold level. It will then bring the motor back up to speed and verify the proper transition sequence before enabling the laser.

If during normal operation, the UP2SPD-2/OVRSPD signal goes low, indicating a motor underspeed or overspeed condition, both the opto-isolator switch U102 and the microcontroller will ensure that the laser is off. If it is a true underspeed condition, UP2SPD1 will also go low, disabling its corresponding opto-isolator switch U101. In any one fault condition, overspeed or underspeed, a minimum of two of the three laser control switches will be disabled.

Figure 4:
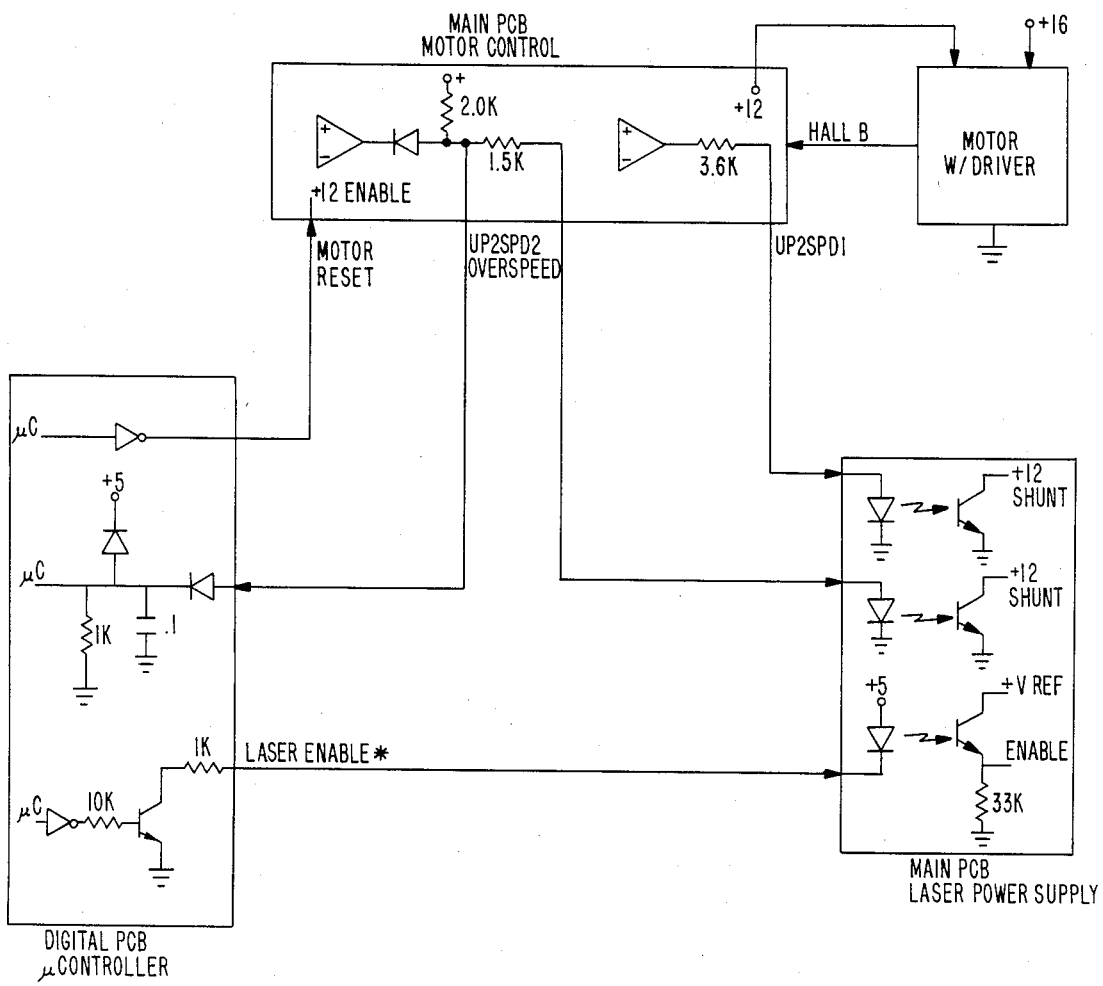
FIG. 4 is a block diagram/schematic related to FIG. 3 and further indicating details of the safety interlock system for shutting off the laser and/or the motor in the event of underspeed or overspeed conditions of the motor.

FIG. 4 simply illustrates in greater detail the block diagram of FIG. 2. For example the main PCB laser power supply shows the three opto-coupled isolator switches in the block diagram of the motor sense/control, and key components or end components for some other blocks of the diagram.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A power supply for a gas laser, comprising:
   a primary controlled and switched flyback circuitry;
   secondary circuitry supplied by the primary circuitry, with a transformer between the primary circuitry and the secondary circuitry; and
   the secondary circuitry including spark gap means for creating a voltage buildup to achieve a high ionization voltage required for the laser and for releasing the high ionization voltage in quick pulses for starting the laser, and further including operating supply means associated with the secondary circuitry and the primary circuitry for supplying the laser at a normal operating voltage much lower than the ionization voltage after the laser has started; and
   wherein the spark gap means includes a spark gap and connected capacitor means for raising the output voltage of the circuit seen by the laser above voltage occurring anywhere else in the circuit.

2. The power supply of claim 1, wherein the operating supply means includes feedback loop means from the cathode side of the laser into the primary circuitry for monitoring cathode side voltage and controlling the secondary side voltage at the transformed.

3. The power supply of claim 1, wherein the secondary circuit includes a maximum of two multipliers supplying the spark gap means, the multipliers being inoperable to increase voltage when current flow exists through the laser.

4. A power supply for a gas laser, comprising:
   a primary controlled and switched flyback circuitry, including a control integrated circuit for controlling switching functions and for controlling startup and turnon functions dependent upon input line voltages, and the primary circuitry including integral low voltage power supply means for supplying the control integrated circuit with a much lower voltage than the voltage fed through the primary circuitry to the primary side of the transformer;
   secondary circuitry supplied by the primary circuitry, with a transformer between the primary circuitry and the secondary circuitry; and
   the secondary circuitry including spark gap means for creating a voltage buildup to achieve a high ionization voltage required for the laser and for releasing the high ionization voltage in quick pulses for starting the laser, and further including operating supply means associated with the secondary circuitry and the primary circuitry for supplying the laser at a normal operating voltage much lower than the ionization voltage after the laser has started.

5. A power supply for a gas laser, comprising:
   a primary controlled and switched flyback circuitry;
   secondary circuitry supplied by the primary circuitry, with a transformer between the primary circuitry and the secondary circuitry;
   the secondary circuitry including spark gap means for creating a voltage buildup to achieve a high ionization voltage required for the laser and for releasing the high ionization voltage in quick pulses for starting the laser, and further including operating supply means associated with the secondary circuitry and the primary circuitry for supplying the laser at a normal operating voltage much lower than the ionization voltage after the laser has started;
   and including a scanner motor associated with the laser, with signal means associated with the motor for generating a speed-representative signal, and wherein the primary circuitry includes laser shutoff means for shutting off power to the laser if the motor is below normal operating speed, including solid state switch means receiving the speed-representative signal from the scanner motor and for causing laser supply power to be shut off when the signal indicate underspeed.

6. The power supply of claim 5, wherein the laser shutoff means includes two said solid state switch means, each for separately receiving the speed-representative signal and for separately shutting off laser supply power.

7. The power supply of claim 5, wherein the solid state switch means comprises an opto-coupled isolator switch.

8. The power supply of claim 6, wherein the solid state switch means comprises an opto-coupled isolator switch.

9. The power supply of claim 6, wherein one of said solid state switch means also shuts off the laser supply power in a motor overspeed condition.

10. The power supply of claim 5, further including a microprocessor connected to the power supply, and including means connecting the microprocessor to receive the speed-representative signal and for shutting off the laser supply power in underspeed conditions.

11. The power supply of claim 10, including an optocoupled isolator switch operably connected to shut off laser power upon a signal from the microprocessor in underspeed conditions.

12. The power supply of claim 10, wherein the microprocessor includes means for sensing the sequence of startup and operation of the motor, and for shutting off the laser supply power and the motor in the event the sequence is not in accordance with pre-stored information.

13. The power supply of claim 5, wherein the scanner motor comprises a closed-loop speed controlled DC brushless motor with a hall effect device providing a hall output, and including motor control circuitry for controlling the operation of the motor and for receiving the hall output and generating the speed-representative signal.

14. The power supply of claim 1, wherein the capacitor means includes a capacitor having one side connected directly to the spark gap.

* * * * *